US010956190B2

(12) United States Patent
Cucinotta et al.

(10) Patent No.: US 10,956,190 B2
(45) Date of Patent: Mar. 23, 2021

(54) METHOD AND SYSTEM FOR MIGRATING A DATA SESSION, A NETWORK ELEMENT AND A COMPUTER PROGRAM PRODUCT

(71) Applicant: Alcatel Lucent, Nozay (FR)

(72) Inventors: Tommaso Cucinotta, Dublin (IE); Eric Jul, Roskilde (DK)

(73) Assignee: Alcatel Lucent, Boulogne-Billancourt (FR)

( * ) Notice: Subject to any disclaimer, the term of this patent is extended or adjusted under 35 U.S.C. 154(b) by 774 days.

(21) Appl. No.: 14/994,298

(22) Filed: Jan. 13, 2016

(65) Prior Publication Data
US 2016/0210166 A1 Jul. 21, 2016

(30) Foreign Application Priority Data
Jan. 15, 2015 (EP) .................................... 15305031

(51) Int. Cl.
*G06F 9/455* (2018.01)
*G06F 9/48* (2006.01)
*G06F 9/50* (2006.01)
*H04L 29/08* (2006.01)

(52) U.S. Cl.
CPC ........ *G06F 9/45558* (2013.01); *G06F 9/4856* (2013.01); *G06F 9/5077* (2013.01); *G06F 9/5088* (2013.01); *H04L 67/1002* (2013.01); *G06F 2009/4557* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

2012/0096459 A1* 4/2012 Miyazaki ............ G06F 9/45558
718/1
2012/0195187 A1* 8/2012 Ashihara ................ G06F 9/46
370/220

OTHER PUBLICATIONS

Shaya Potter et al. Web Pod: Persistent Web Browsing Sessions with Pocketable Storage Devices, Web Pod, 2005, 603-612.
Examination Report from the European Patent Office for EP Appl. No. 15 305 031.5 dated Mar. 1, 2019.

* cited by examiner

*Primary Examiner* — Lewis A Bullock, Jr.
*Assistant Examiner* — Melissa A Headly
(74) *Attorney, Agent, or Firm* — Harness, Dickey & Pierce, P.L.C.

(57) ABSTRACT

The method includes modifying a routing rule of a load balancer of the system, the rule representing at least one parameter for communications between a client device and the first VM to specify that data from the client device destined for the first VM instance is queued, suspending processing, at the first VM instance, of pending requests from the client device, transmitting data, from the first VM instance, to the load balancer representing the state of the or each suspended request, modifying the routing rule to specify that the endpoint for a communication channel from the second VM instance is the client device, transmitting the or each suspended request to the second VM instance, and modifying the routing rule to specify transmission of data from the client device directly to the second VM instance.

15 Claims, 3 Drawing Sheets

METHOD AND SYSTEM FOR MIGRATING A DATA SESSION, A NETWORK ELEMENT AND A COMPUTER PROGRAM PRODUCT

CROSS-REFERENCE TO RELATED APPLICATIONS

This application claims priority from European Patent Application No. 15305031.5 filed on Jan. 15, 2015 in the European Intellectual Property Office, the disclosure of which is incorporated herein by reference in its entirety.

TECHNICAL FIELD

Aspects relate, in general to a method and system for migrating a data session, a network element and a computer program product for the same.

BACKGROUND

Cloud components and services in a cloud-based or virtualized system (all of which are referred to as service, from hereon in, without loss of generality) can grow and shrink their allocated resources dynamically based on instantaneous workload conditions.

For example, virtual machine (VM) instances of the system that are used to provide the service can be spawned or deleted. Such VM instances will typically execute an application for a service, or an application part that, in conjunction with other VM instances executing application parts, can process data to provide a service.

A load-balancer (LB) element can be used to spread incoming requests across the available VMs of the service for clients. That is, client requests (and processed data to be passed to a client) can be distributed using an LB element of the system. The LB will typically distribute requests between VMs according to some policy (e.g., weighted round-robin or least-loaded or based on the source IP address and/or other IP header fields, or others).

SUMMARY

According to an example, there is provided a method, in a virtualized system comprising multiple virtual machine (VM) instances executing over physical hardware, for migrating a data session from a first VM to a second VM, the method comprising modifying a routing rule of a load balancer of the system, the rule representing at least one parameter for communications between a client device and the first VM to specify that data from the client device destined for the first VM instance is queued, suspending processing, at the first VM instance, of pending requests from the client device, transmitting data, from the first VM instance, to the load balancer representing the state of the or each suspended request, modifying the routing rule to specify that the endpoint for a communication channel from the second VM instance is the client device, transmitting the or each suspended request to the second VM instance, and modifying the routing rule to specify transmission of data from the client device directly to the second VM instance. Data relating to a suspended request can be queued in a buffer device of the load balancer. The load balancer can be a software defined networking element, and wherein modifying the routing rule can include updating a routing table to specify an IP or MAC address of a device or VM instance. The load balancer can be inhibited, prevented or otherwise constrained from forwarding data from the client device to the first VM instance. Inhibition can automatically be implemented upon instantiation of a new VM instance. A data session can be migrated in response to scaling of the number of VM instances of the system due to a variation in system load. The load balancer can maintain a table of inhibited sessions representing sessions to be migrated or being migrated, the load balancer operable to queue data from the client device relating to an inhibited session. The table of inhibited sessions can include a queue for incoming packets that arrive while a session is inhibited.

According to an example, there is provided a system comprising multiple virtual machine (VM) instances executing over physical hardware, the system including a network element operable to migrate a data session from a first VM to a second VM by modifying or receiving data representing a modified routing rule representing at least one parameter for communications between a client device and the first VM to specify that data from the client device destined for the first VM instance is queued, suspending processing, at the first VM instance, of pending requests from the client device, transmitting data, from the first VM instance, to the load balancer representing the state of the or each suspended request, modifying the routing rule to specify that the endpoint for a communication channel from the second VM instance is the client device, transmitting the or each suspended request to the second VM instance, and modifying the routing rule to specify transmission of data from the client device directly to the second VM instance. The network element can include a buffer operable to receive data to be queued from the client device. The system can inhibit the network element from forwarding data from the client device to the first VM instance. The network element can maintain a table of inhibited sessions representing sessions to be migrated or being migrated, the network element operable to queue data from the client device relating to an inhibited session.

According to an example, there is provided a network element in a virtualized system comprising multiple virtual machine (VM) instances executing over physical hardware, the network element operable to migrate a data session from a first VM to a second VM, by modifying or receiving data representing a modified routing rule representing at least one parameter for communications between a client device and the first VM to specify that data from the client device destined for the first VM instance is queued, suspending processing, at the first VM instance, of pending requests from the client device, transmitting data, from the first VM instance, to the load balancer representing the state of the or each suspended request, modifying the routing rule to specify that the endpoint for a communication channel from the second VM instance is the client device, transmitting the or each suspended request to the second VM instance, and modifying the routing rule to specify transmission of data from the client device directly to the second VM instance. The network element can include a buffer device operable to store data representing a pending request from the client device. The network element can include a memory operable to store multiple routing rules including an IP or MAC address of a device or VM instance.

According to an example, there is provided a computer program product, comprising a computer usable medium having computer readable program code embodied therein, said computer readable program code adapted to be executed to implement a method for migrating a data session as provided herein.

BRIEF DESCRIPTION OF THE DRAWINGS

Embodiments will now be described, by way of example only, with reference to the accompanying drawings, in which.

DESCRIPTION

Figure 1:
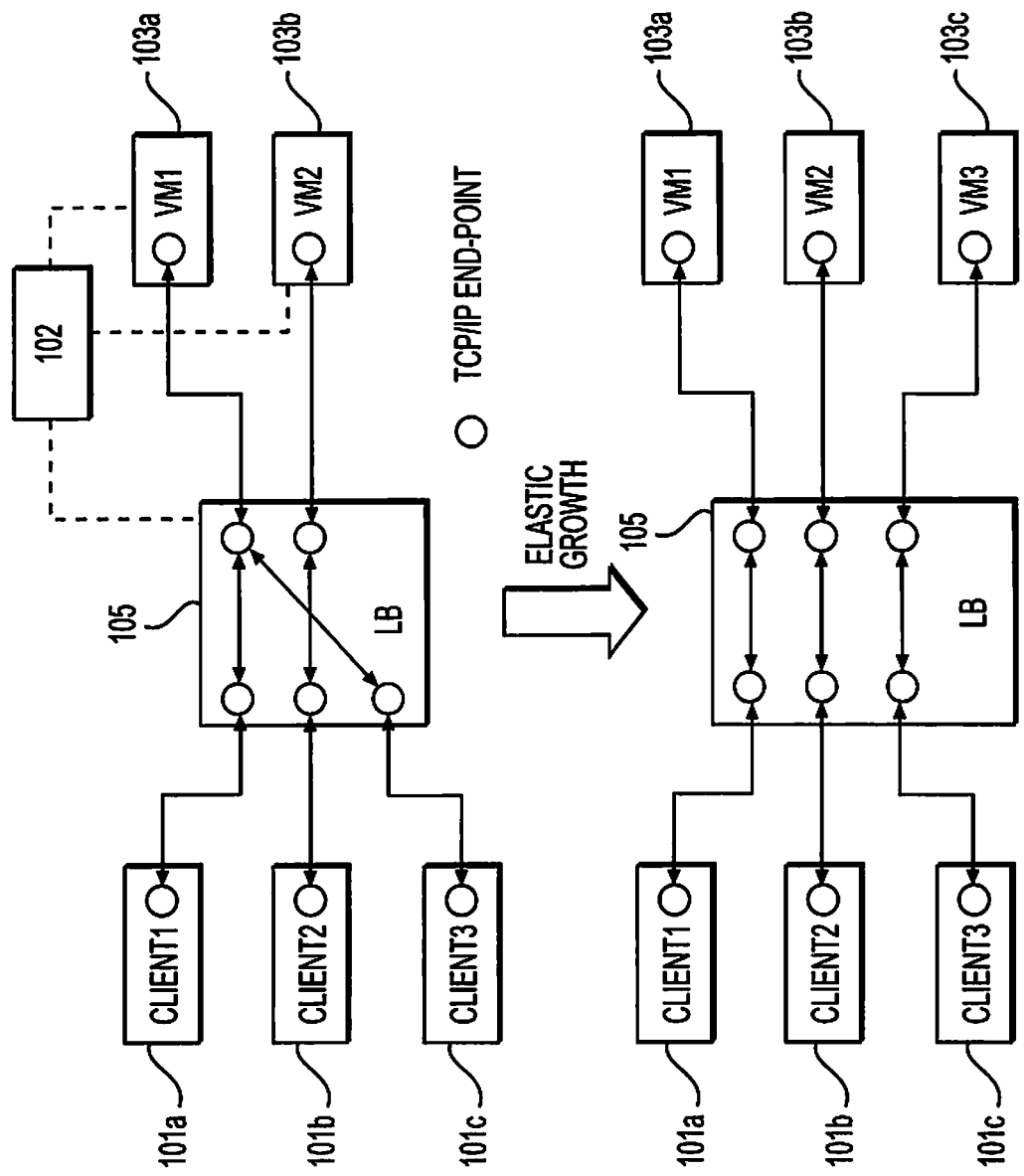
FIG. 1 is a schematic representation of a typical system in which a load balancer is used to distribute data between clients and VMs.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Typically, clients of a service executing on a virtualized system, such as a cloud-based platform in which multiple VM instances are executing over physical hardware, can be remote end-users who connect to an IP address corresponding to a load balancer (LB) of the system. The LB listens for and can accept the connection on behalf of the service or component that the client wishes to use, and can open a connection (internal to the LB plus VMs service ensemble) to one of the available service VMs according to the LB policy. The LB then forwards any traffic back and forth between the two connections, that is between the client and the (or each in the case that multiple VMs are used, for instance multiple VMs executing the same application or service) VM.

From an elasticity perspective, this set-up has the advantage of allowing a seamless change of the VM that serves a particular user as needed for rebalancing the workload after an elastic growth or de-growth, without the user noticing anything. Indeed, in such cases, the LB would close the internal connection with a VM, and re-open it with another VM, without the client noticing anything, as the connection with the LB would not change.

FIG. 1 is a schematic representation of a typical system in which a load balancer is used to distribute data between clients and VMs. Three client apparatuses 101a-c are served by two VMs 103a-b (upper part of FIG. 1) via a LB 105. Interconnects within the LB 105 indicating the flow of data between clients and VMs are schematically shown in FIG. 1. The VMs execute over physical hardware 102. The LB 105 may be provided as a hardware component of the hardware 102, or may be provided as a virtual component executing within the hardware 102, perhaps even as a VM. For the sake of clarity, element 102 is not shown in other figures.

As a result of a change in the load on the system, a scale-out process adds a third VM, VM3 103c (lower part of FIG. 1). Such scaling process are well known, and not described in any more detail. For example, if a metric associated with CPU load of VM1 103a reaches or exceeds a threshold, a further VM (such as VM3 for example) can be instantiated for the system in order to take a portion of the load from an overloaded VM and/or in order to deal with any new incoming requests that would otherwise have been passed to a VM that is at or reaching threshold (according to some known loading metric such as that noted above for example). The new VM, VM3 (103c) can execute an application or application part for a service the same as that executed by VM1. That is, VM3 can provide an additional instance of VM1 that is able to reduce the load on VM1 for the service in question and/or deal with any future requests from a client for the service or application.

For instance, as noted in FIG. 1, Client1 and Client3 requests are passes by LB 105 to VM1. Depending on the demands placed on VM1, it would therefore be reasonable to assume that the load of VM1 may be larger than the load of VM2, which is dealing with requests from Client2 only.

Once VM3 is instantiated, the state of Client3 101c can be moved from VM1 to VM3. That is, for example, any pending requests to be handled by VM1 can be moved to VM3 for processing. This is seamless to the client.

A TCP connection between the LB 105 and VM1 103a that serves Client3 101c can be taken down and a new TCP connection can be established with VM3 103c. This new TCP connection now sends Client3's network traffic to VM3, which is the new server for Client3. The disadvantage of this technique is that the LB 105 has to receive all the traffic coming from clients, and then forward it to the right destination VM. This adds latency to the end-to-end process of serving each user request, and it also adds computation load to the LB, which may easily saturate the LB available According to an example, a method and system as provided herein enables the migration of existing sessions, such as TCP/IP connections with clients, from one VM to another one without using a LB to receive and resend all the traffic. At the same time, the mechanism can guarantee no data loss in the migration and elasticity process.

At a broad level, according to an example, a guest operating system executing within a VM is modified to enable migration of a TCP or UDP end-point, along with any associated state, to another VM within a cluster of VMs realizing a distributed service. For example, in a Linux OS, said modifications can be realized in the kernel realizing the TCP/IP networking stack for the OS; a state associated to a TCP/IP end-point includes TCP connection state data or previously received partial UDP packets (due to the use of fragmented UDP packets for example). An API can be provided for serializing a TCP/IP end-point into a byte stream that can be sent to a destination VM, where the end-point is perfectly restored de-serializing the byte stream. In an example, a part or the whole of the workload of a VM, along with any possibly associated state which may be stored internally to the VM, can be migrated from one VM to another.

According to an example, a LB apparatus is a software defined networking (SDN)-capable network element that can dynamically route incoming requests to one of a number of VMs, rewriting the destination IP address of the request, normally identifying the LB device, and replacing it with the IP address of the actual target VM.

Whenever a service requires migration of part of its workload from one VM to another—from a migrating (sending) VM to a destination (receiving) VM—the following protocol can be performed between the two involved VMs and the LB.

The load balancer, or network element, can include multiple routing rules, such as in the form of a routing table for example, that include one or more parameters specifying the destination address, such as a MAC or IP address, for communications between a client device and a VM. For example, a routing rule can specify that data from a particular client is sent to a particular VM, which can be identified using its MAC or IP address for example.

When a change in the load on the system results in a scale-out process that adds another VM, an overloaded VM can have parts of its load migrated to a new VM. Accordingly, any new processing requests from a client can be redirected to the new VM. In an example, any number of different policies can be applied to choose which of the clients processing should be moved to the new VM. For example, a routing rule can be used in which the IP address of the client is hashed using a hash function and then the hash value is used to decide which of the clients should be handled by the new VM, e.g., if 40% of the load is to be moved to the new VM, the client IP addresses can be hash to a value between 0 and 100 and those that hash to a value less than 40 can be migrated. A routing table can be automatically updated to reflect the decision reached by the routing rule. New requests can be handled by the LB by hashing the requestor's IP address and routing the request to a VM based on the hash value (such as the hash value modulo the number of VMs).

The sending VM (or equivalently the sending host OS or hypervisor or a cloud orchestrator component) informs the LB (or the SDN controller which in turn reprograms the LB) that the migration of the service VM's entire service workload, or a part of it, is going to happen. For example, as a result of load variation in a system in which the VM executes to provide a service (or part of a service along with multiple other VMs) the sending VM may have reached a capacity threshold according to a metric (e.g. CPU load and so on, as are typically known). A further VM can therefore be instantiated in order to deal with further requests that would otherwise overload the migrating VM.

According to an example, when a decision to instantiate a further VM is made (such as in response to an increased load for example, as it typical), the LB stops forwarding any further traffic related to the sessions that are being migrated. This inhibition can be done by maintaining a table of the inhibited sessions. The table can also contain a queue for incoming packets that arrive while a session is inhibited. For example, a VM may be serving a client for which another VM is to be instantiated due to an increase in load from the client for example. Sessions that are active in that VM can be logged or otherwise recorded in the table of inhibited sessions in order to record sessions for which data should be queued in order to enable the migration of one or more of the sessions to a new VM.

Following an inhibition, the LB stores any incoming packets related to the affected sessions within an internal queue. In an example, a queue can be a storage device that is part of or is otherwise accessible to the LB, such as part of the physical hardware over which VMs are instantiated, for example. In an example, a session for a VM can represent a semi-permanent interactive information interchange between the client and a VM, or may more generally represent the on-going interactive information interchange between the client and a VM, which may cease, for example, when the client no longer wishes to use the VM, or until the VM is no longer active. Thus, it will be appreciated that migration of a session can include migrating session data associated with a semi-permanent interactive information interchange between the client and a VM, or migrating all interactions between a client and VM to another VM. An inhibited session can therefore be a session which is being or is to be migrated from one VM to another VM.

The migrating VM carries over the migration of its workload or the to-be-migrated part of it, along with any associated state data, both application-level state and OS/kernel-level state, to the destination VM. This migration is done using standard data and thread migration techniques, i.e., the state associated with each request being migrated is copied to the destination VM. Any thread executing on a request is also migrated using standard thread migration techniques.

The destination VM restores sessions and internal state corresponding to the migrated part of the workload within the service internal state and restores any corresponding TCP/IP end-points. The LB is informed that the migration has completed, and in response, the LB sends any queued traffic to the destination VM. When the LB has forwarded all queued traffic, it stops queuing new incoming traffic, and resumes forwarding such traffic as for all other traffic, i.e., the inhibiting mechanism is removed. Any traffic related to the migrated workload now gets its IP replaced with the new target VM IP address, and it is forwarded to the new VM.

Whenever a service requires migration of a significant part of its workload, these steps can be iterated multiple times, with subparts of the workload migrated each time, in order to guarantee a sufficiently small inhibition period at the LB, corresponding to non-responsiveness of the service limited to the part of the workload/sessions/users being migrated.

Figure 2:
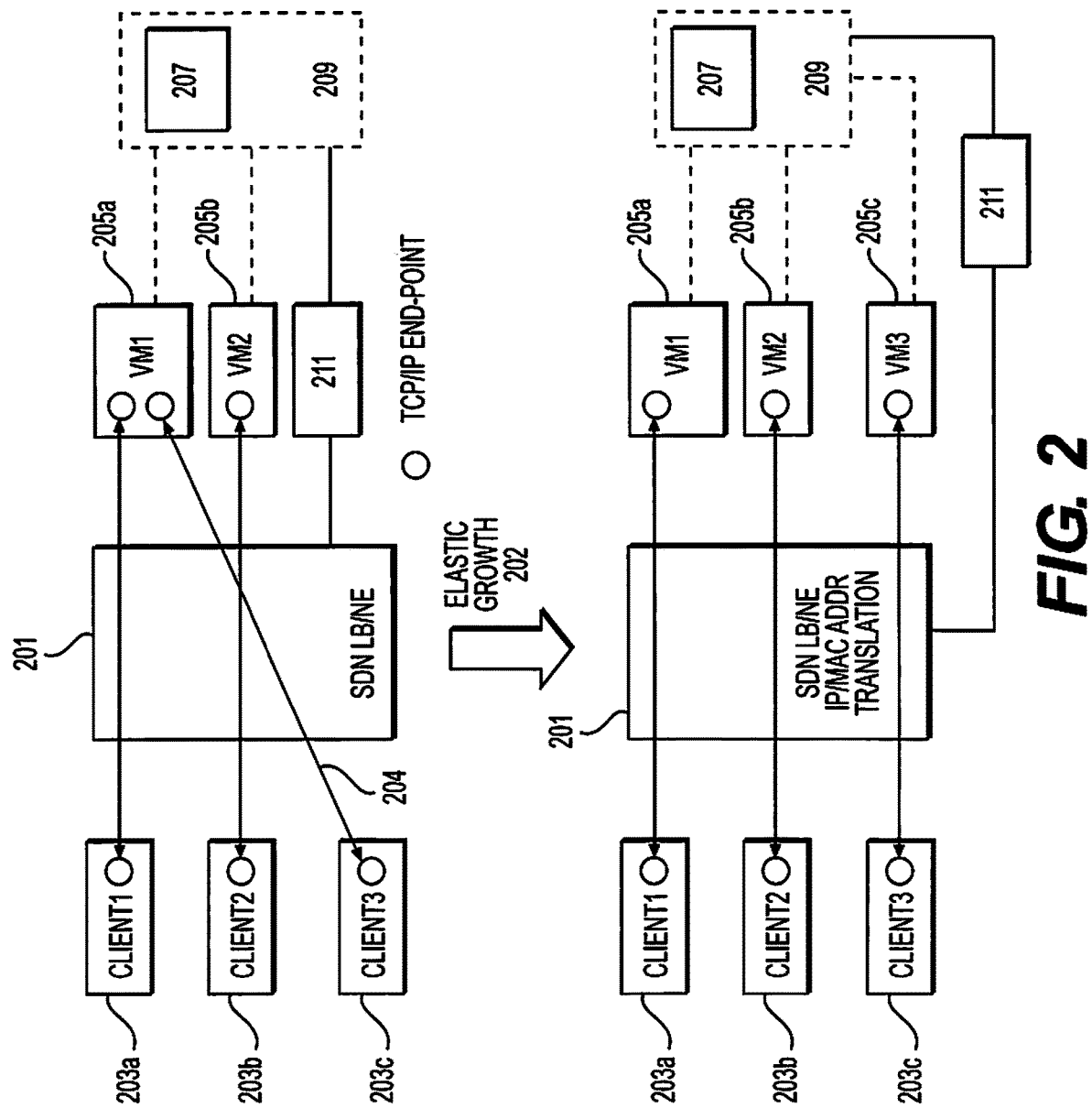
FIG. 2 is a schematic representation of a system including an SDN-enabled controller Network Element (SDN LB/NE) according to an example.

FIG. 2 is a schematic representation of a system including an SDN-enabled controller Network Element (SDN LB/NE) according to an example. In the example of FIG. 2 (top portion before elastic growth 202), an SDN-enabled controller Network Element (SDN LB/NE) 201, three remote clients 203a-c with TCP connections (denoted by arrows), and two VMs 205a-b that serve the clients 203a-c are provided.

In an example, the VMs 205a-b execute over physical hardware 207, which can be provided as part of a data center 209 for example, and the SDN LB/NE 201 is a network element connected by a local area network 211 to the machines running the VMs. The SDN LB/NE 201 distributes requests from the clients using the TCP/IP end points of the VMs.

In the example of FIG. 2, when elastic growth 202 is initiated, the SDN LB/NE 201 is re-tasked to redirect the TCP connection 204 for Client3 203c so that the end point that before was on VM1 205a is moved to the newly established VM3 205c.

In an example, the SDN LB/NE 201 can be reprogrammed to deliver data to VM3's MAC address instead of VM1's. For example, a routing table of the SDN LB/NE 201 can be updated to reflect the destination for data received from Client3. An update can be performed automatically or manually. For example, the MAC address of a new VM, VM3, which is instantiated in response to growth 202 (such as because of increased system load) is added to a list of available resources at the SDN LB/NE 201. VM3 is instantiated as a result of load variation in connection with VM1—that is, Client3 requests for VM1 have caused VM1 to exceed or reach a capacity threshold for example. Accordingly, SDN LB/NE 201 can modify a destination address for request from Client3 to new VM, VM3. A suitable process according to example is described in more detail below with reference to FIG. 3.

The state of Client3's requests that are currently being served by VM1 is migrated to VM3. After the scale/growth 202, the situation at the bottom of FIG. 2 is provided in which client3 requests are handled by VM3. However, during the migration to VM3, there may be new incoming requests and there may be data flowing back to the client.

Figure 3:
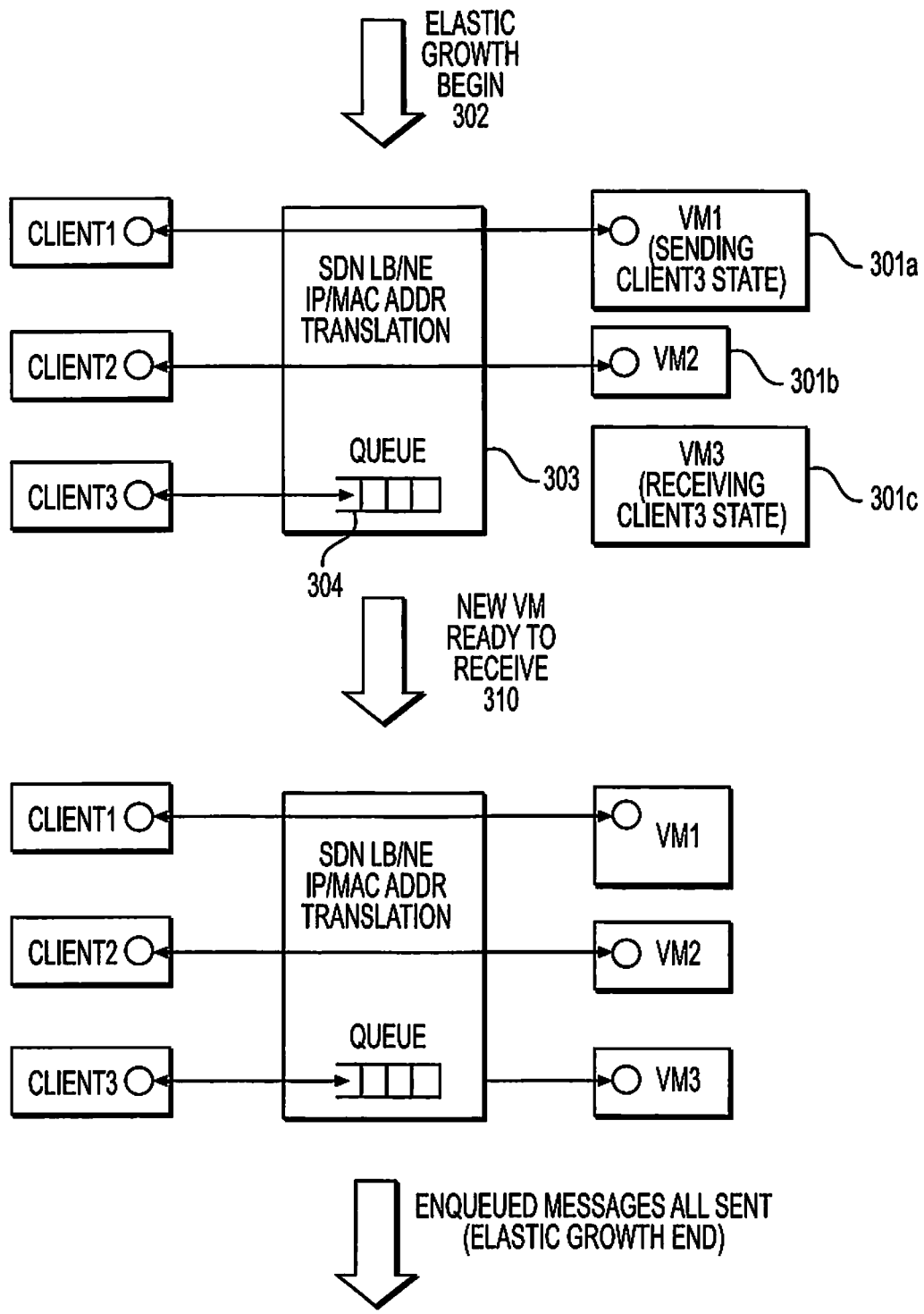
FIG. 3 is a schematic representation of a system including an SDN-enabled controller Network Element (SDN LB/NE) according to an example.

Accordingly, and with reference to FIG. 3, which is a schematic representation of a system including an SDN-enabled controller Network Element (SDN LB/NE) according to an example, the following steps to achieve a safe and consistent migration to VM3 can be performed.

Upon initiation of the scale-up 302, such as in response to load variation as described above for example, a new VM can be instantiated (VM3, 301c). The process to instantiate a new VM in response to a variation in the load of a system, service or an individual VM is well known, and is not described here in any more detail. After the VM3 301c starts, it is initiated with the application server code. For example, and again as is typically known, the new VM3 receives data from the SDN LB/NE 303 which can include an application and modules such as communications and authentication modules for example to enable the VM to function. The SDN LB/NE 303 can also supply application specific modules to enable the VM to perform a required service via a storage location such as storage in hardware 207 for example. For example, if the VM in question is required to process audio data, an application specific module to convert one form of audio data to another can be provided to enable the VM to function as an audio convertor. Generally speaking, it is well known to instantiate a VM in response to load variation and to load that new VM with the desired application or service data to enable it to function as desired.

Once VM3 is instantiated and functional (310), the SDN LB/NE 303 is re-tasked or reprogrammed so that TCP messages from Client3 are queued. For example, a routing table or similar at the SDN LB/NE 303 can be updated so that any messages from Client3 are stored in a buffer or queue 304 of the SDN LB/NE 303.

VM1 suspends processing of the requests from Client3 and sends the state of these suspended requests to VM3 via the SDN LB/NE 303. The endpoint of Client3's TCP connection is reprogrammed in the SDN LB/NE 303 from VM1 to VM3, so that any messages from VM3 are passed to Client3. VM3 receives Client3's state and resumes serving these requests. The SDN LB/NE 303 can then send any queued messages (304) to VM3. When all queued messages have been sent, the SDN LB/NE 303 can be reprogrammed to pass TCP messages from Client3 directly to VM3. Hereafter all messages are routed to VM3 (lower part of FIG. 3).

A similar set of steps can be executed at degrowth—the steps are identical except for the change of stopping a VM instead of starting a new one.

Thus, according to an example, an SDN LB/NE efficiently routes every TCP connection to the correct VM at the hardware level while still allowing dynamic redirection of TCP connections so as to support elasticity. The overhead of passing messages between two TCP connections is eliminated almost entirely. In existing applications, this has been a limiting factor for scalable system in that all messages have to go through a LB and that means the LB is a bottleneck—one can have almost unlimited number of VMs, but a given LB can only support a limited number of TCP connections before it is saturated. According to an example, 1-2 orders of magnitude more VMs can be supported as an SDN enabled controller can route messages 1-2 orders of magnitude faster than a user process that read from one TCP connection and passes messages onto another TCP connection.

In an example, the low level MAC addresses of the TCP connections are changed in an SDN LB/NE.

As used herein, the term virtual machine is not intended to be limiting. For example, a virtual machine can be in the form of an execution environment in the form of a container, or by way of OS-level virtualization for example. Accordingly, different isolated containers, or namespaces, or execution environments, residing in the same OS, but sufficiently isolated so that they are essentially executing in an exclusive OS environment can be used.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method, in a virtualized system comprising multiple virtual machine (VM) instances executing over physical hardware, for migrating a data session from a first VM instance to a second VM instance, the method comprising:
    modifying a routing rule of a load balancer of the system such that the routing rule specifies that data from a client device destined for the first VM instance is queued, the routing rule representing at least one parameter for communications from the client device;
    suspending processing, at the first VM instance, of pending requests from the client device;
    transmitting, from the first VM instance to the load balancer, data representing a state of each pending request among the pending requests;
    modifying the routing rule such that the routing rule specifies that the endpoint for a communication channel from the client device is the second VM instance;
    transmitting the pending requests to the second VM instance; and
    after transmitting the pending requests, modifying the routing rule such that the routing rule specifies that data from the client device is transmitted directly to the second VM instance.

2. The method of claim 1, wherein data relating to a suspended request is queued in a buffer device of the load balancer.

3. The method of claim 1, wherein the load balancer is a software defined networking element, and wherein modifying the routing rule includes updating a routing table to specify an IP or MAC address of a device or VM instance.

4. The method of claim 1, wherein the load balancer is inhibited from forwarding data from the client device to the first VM instance.

5. The method of claim 1, wherein a data session is migrated in response to scaling of the number of VM instances of the system due to a variation in system load.

6. The method of claim 1, wherein the load balancer maintains a table of inhibited sessions representing sessions to be migrated or being migrated, the load balancer operable to queue data from the client device relating to an inhibited session.

7. The method of claim 6, wherein the table of inhibited sessions includes a queue for incoming packets that arrive while a session is inhibited.

8. A non-transitory computer readable medium including computer readable instructions, the computer readable instructions being adapted to be executed by a processor to implement the method for migrating a data session as claimed in claim 1.

9. A physical hardware system executing multiple virtual machine (VM) instances, the system including a network element operable to migrate a data session from a first VM instance to a second VM instance by:
- modifying or receiving data representing a routing rule such that the routing rule specifies that data from a client device destined for the first VM instance is queued, the routing rule representing at least one parameter for communications from the client device;
- suspending processing, at the first VM instance, of pending requests from the client device;
- transmitting, from the first VM instance to a load balancer, data representing a state of each pending request among the pending requests;
- modifying the routing rule such that the routing rule specifies that the endpoint for a communication channel from the client device is the second VM instance;
- transmitting the pending requests to the second VM instance; and
- after transmitting the pending requests, modifying the routing rule such that the routing rule specifies that data from the client device is transmitted directly to the second VM instance.

10. The physical hardware system of claim 9, wherein the network element includes a buffer operable to receive data to be queued from the client device.

11. The physical hardware system of claim 9, wherein the system is operable to inhibit the network element from forwarding data from the client device to the first VM instance.

12. The physical hardware system of claim 9, wherein the network element is operable to maintain a table of inhibited sessions representing sessions to be migrated or being migrated, the network element operable to queue data from the client device relating to an inhibited session.

13. A processor in a virtualized system comprising multiple virtual machine (VM) instances executing over physical hardware, the processor operable to migrate a data session from a first VM instance to a second VM instance, by:
- modifying or receiving data representing a routing rule such that the routing rule specifies that data from a client device destined for the first VM instance is queued, the routing rule representing at least one parameter for communications from the client device;
- suspending processing, at the first VM instance, of pending requests from the client device;
- transmitting, from the first VM instance to a load balancer, data representing a state of each pending request among the pending requests;
- modifying the routing rule such that the routing rule specifies that the endpoint for a communication channel from the client device is the second VM instance;
- transmitting the pending requests to the second VM instance; and
- after transmitting the pending requests, modifying the routing rule such that the routing rule specifies that data from the client device is transmitted directly to the second VM instance.

14. The processor of claim 13, further including a buffer device operable to store data representing a pending request from the client device.

15. The processor of claim 13, further including a memory operable to store multiple routing rules including an IP or MAC address of a device or VM instance.

* * * * *